United States Patent

Kade et al.

[11] Patent Number: 5,154,009
[45] Date of Patent: Oct. 13, 1992

[54] JOURNAL FOR A HOLLOW ROLL BODY, SPECIFICALLY FOR A DRYING CYLINDER OF A PAPER MACHINE

[75] Inventors: Werner Kade; Wolfgang Breuninger; Ernst Przibylla, all of Heidenheim, Fed. Rep. of Germany

[73] Assignee: J.M. Voith GmbH, Heidenheim, Fed. Rep. of Germany

[21] Appl. No.: 494,847

[22] Filed: Mar. 14, 1990

Related U.S. Application Data

[63] Continuation of Ser. No. 248,949, Sep. 23, 1988, abandoned.

[30] Foreign Application Priority Data

Oct. 13, 1987 [DE] Fed. Rep. of Germany ....... 3734524

[51] Int. Cl.$^5$ .............................................. F26B 25/00
[52] U.S. Cl. ........................................ 34/108; 34/119; 34/125; 165/90
[58] Field of Search ................... 165/90, 89; 29/116.2, 29/116.1, 129.5; 34/108, 119, 125

[56] References Cited

U.S. PATENT DOCUMENTS

| 2,413,567 | 12/1946 | Hornbostel | 34/124 |
| 2,817,908 | 12/1957 | Hornbostel | 34/110 |
| 3,224,110 | 12/1965 | Kroon | 34/124 |
| 4,735,262 | 4/1988 | Lucas | 165/89 |

FOREIGN PATENT DOCUMENTS 2104392 5/1979 Fed. Rep. of Germany .

Primary Examiner—Albert J. Makay
Assistant Examiner—John Sollecito
Attorney, Agent, or Firm—Baker & Daniels

[57] ABSTRACT

A hollow shaft bearing for a drying cylinder of a paper machine. The hollow shaft bearing is provided with thermal insulation between the interior of the hollow shaft and the surface of the journal on which a bearing is supported. The insulation is formed by a coaxial annular space formed between the inside wall of the hollow shaft and the outside wall of the hollow shaft which supports the bearing.

14 Claims, 2 Drawing Sheets

JOURNAL FOR A HOLLOW ROLL BODY, SPECIFICALLY FOR A DRYING CYLINDER OF A PAPER MACHINE

This is a continuation of application Ser. No. 248,949, filed Sep. 23, 1988 now abandoned.

BACKGROUND OF THE INVENTION

The present invention concerns a journal through which flows a heat transfer medium and which is designed as a hollow shaft for a hollow roll body, specifically for a steam-heated drying cylinder of a paper machine, wherein thermal insulation formed by a coaxial annular space is provided between the interior space of the hollow shaft and a bearing supporting it.

Configurations of that type are known and are used specifically in conjunction with steam-heated drying cylinders of the drying section of a paper machine. These drying sections serve to dry the paper web that has been dewatered in the press section but is still moist (dry content of 35–50%); the residual water is evaporated in the drying section. The drying section itself consists of steam-heated drying cylinders that can be combined into controllable groups. The drying cylinders are generally heated with steam at a pressure up to about 10 bars. The steam enters sideways through the journals of the drying cylinders. The heat released as the steam condenses is conducted through the relatively thin cylinder walls to the paper web, drying it slowly. The accruing condensate is removed by means of rotating or fixed siphons, generally through the same journal through which the steam is admitted. The maximum temperature in the drying cylinders is about 120°–190° C.

As mentioned before, the steam is admitted through a drying cylinder journal which is fashioned as a hollow shaft or a hollow cylinder. The accruing condensate is then removed by way of the same journal or also a second journal.

Antifriction bearings, specifically self-aligning roller bearings are used for the rotatable mounting of the drying cylinder. These bearings are arranged, for one, on the journals fashioned as a hollow shaft and which, on the other hand, bear on suitable pillow blocks.

These journals, and thus also the bearings themselves, are heated by the steam and/or condensate passing therethrough. In the process, a problem arises since the inner race of the antifriction bearing, press-fitted on the hollow shaft, assumes a temperature higher than the outer race of the antifriction bearing, thereby reducing the play of the antifriction bearing. In the extreme case, this bearing play may be reduced to zero, ultimately giving rise to the risk of destroying the bearing.

In addition to this aspect of risk, the varying operating temperature developing in the bearing affects the lubricating properties and service life of the lubricating oil.

To overcome this problem, various suggestions or approaches of solution have already been made, which in principle are based on providing, between the cylinder bore of the hollow shaft through which the steam or condensate flows and the bearing, a means or measures for thermal insulation.

Known from U.S. Pat. No. 2,413,567 is a drying cylinder wherein the cylinder plates delimiting the interior of the cylinder each include a molded hollow journal and an additional, bolted hollow journal which accommodates the bearing. Provided for steam admission or condensate removal is a stationary device which extends through the molded hollow journal and is sealed relative to the hollow journal by means of packing chambers. The mentioned means for thermal insulation of the bearings consist of a socket of insulating material which is slipped on the molded hollow journal, the outside diameter of which socket is so selected that an air gap is present between the socket and the bolted hollow journal. Due to the two-part journal, this design is relatively expensive.

U.S. Pat. No. 2,817,908 depicts a drying cylinder for paper machines with a double-wall steam inlet pipe wherein the annular space between the two walls acts as an insulation layer. Another thermal insulating space is provided between the outer wall of the steam inlet pipe and the hollow journal itself.

The double-wall steam inlet pipe is, on one end, screwed to the hollow journal while on the other end a movable packing is provided. This packing allows for the fact that the steam inlet pipe expands in the axial direction more than does the hollow journal, and it seals the thermal insulating space between the steam inlet pipe and the hollow journal. In practical use, however, this concept has proved to be problematic as the space cannot be dependably sealed in the long run. Condensate accumulates in the course of time in this intermediate space and the thermal insulating effect is increasingly lost.

Regarding the thermal insulating annular space between the two walls of the steam inlet pipe, it can be durably sealed. But considering that these two walls vary in their axial expansion, an equalization element needs to be provided, for instance a bellows.

Viewed overall, the design according to U.S. Pat. No. 2,817,908 is thus also too complicated and expensive.

U.S. Pat. No. 3,224,110, moreover, shows a drying cylinder where the annular space between a condensate outlet pipe and a hollow journal is filled with thermal insulating material. Here, too, the problem arises that, due to the varying axial expansion of the hollow journal and the condensate outlet pipe a movable packing needs to be provided, the service life of which naturally is limited. Once the effect of the packing is reduced, condensate will eventually seep into the thermal insulating material, so that the insulating effect will be increasingly lost.

Another proposal which has become known for the solution of the initially mentioned problem consists of compensating for the operationally developing temperature difference between the inner and outer races of the antifriction bearing means of a cooling device provided in or on the antifriction bearing, or to at least minimize the temperature difference. This proposed solution has been demonstrated to be insufficient.

The problem underlying the present invention consists of providing a journal of the categorial type which is of simple design and wherein the thermal insulation between the cylinder bore of the hollow shaft serving as a pipe for the heat transfer medium and the inner race of the antifriction bearing is so conceived that no condensate can penetrate and reduce the insulating effect.

SUMMARY OF THE INVENTION

In a bearing through which flows a heat transfer medium and which comprises a single piece hollow shaft for a hollow roll body, wherein thermal insulation is provided between the interior of the hollow shaft and a bearing supporting it, the insulation comprises a coaxial annular space formed between the inside wall of the hollow shaft and its outside wall accommodating the bearing. The preferred area of application for such a journal concerns a steam-heated drying cylinder of a paper machine.

An advantage of the journal according to the instant invention is that no additional component is needed in the interior space of the hollow shaft for thermal insulation and that, for another, the risk of condensate penetration in the insulation is eliminated.

Another advantage of the journal according to the instant invention is the fact that, in the case of maintenance or repair work, the journal can be installed and removed as a complete unit and that, due to the specific design of the journal in view of the thermal insulation between the cylinder bore and the inner race of the antifriction bearing, this journal and the thermal insulation have long durability and utility.

Basically, this coaxial annular space can be realized by machining or casting using core elements; additionally, the annular space can be filled with a suitable thermal insulating material.

Providing the annular space by casting offers the additional possibility of adapting the core, and thus the annular space, to the outer contour of the outside wall of the journal, so as to deliberately influence the heat transfer between the inner and the outer wall.

A particular embodiment of the annular space provided by casting consists in forming it by a cast-in double-walled body from plate.

BRIEF DESCRIPTION OF THE DRAWINGS

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
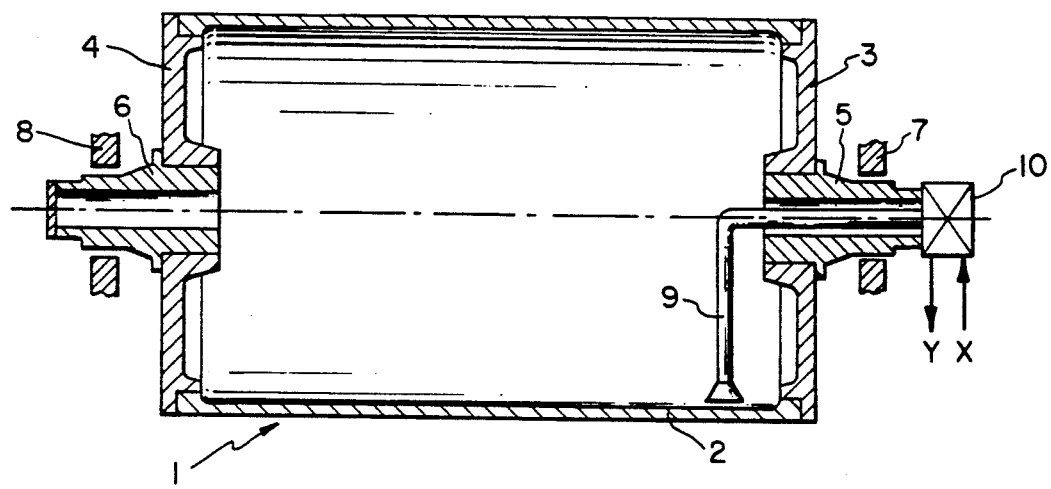
FIG. 1 shows a drying cylinder of a paper machine in cross section.

Illustrated in FIG. 1 is a drying cylinder 1 of a drying section of a paper machine, which drying cylinder consists of a relatively thin-walled cylinder 2 and two end plates 3, 4 delimiting the cylinder 2. Defined is thus the interior space of the drying cylinder 1 or the condensate space for the saturated steam. The two cylinder end plates 3, 4 each feature, coaxially, a journal 5, 6 which is fashioned as a hollow shaft and are each rotatably mounted through the intermediary of an—only schematically illustrated—antifriction bearing 7, 8 on a—not illustrated—pillow block.

Operationally, the drying cylinder 1 rotates about its own axis. Moisture is removed from the paper web which, by a so-called drying felt, is forced on the cylinder 2. To accomplish this, the interior space of the drying cylinder 1 is charged with steam (arrow X) through the central bore of the—right hand in FIG. 1—journal 5. This steam condenses on the inside wall of the cylinder 2 in the area where the paper web loops around and is eventually removed again in the form of condensate through a siphon 9 (arrow Y).

In the example according to FIG. 1, one and the same journal—here the journal 5—serves as both a feed channel for the steam and as a conduit for the outlet channel of the condensate. Steam and condensate are thus separately admitted and removed through a schematically illustrated steam head 10 which is flanged to the journal 5. As already mentioned, it is conceivable to admit the steam on one journal (for instance 5) and connect and apply the siphon on the second journal (for instance 6).

The problem addressed by the present invention lies in the transitional area between the bore of the journal 5 through which the steam flows and the antifriction bearing 7. The heat transfer in this area is to be so influenced that the operating temperature of the antifriction bearing as a whole will be maximally low and remain extensively consistent, i.e., that no appreciable temperature differences will occur between the inner and outer race.

Figure 2:
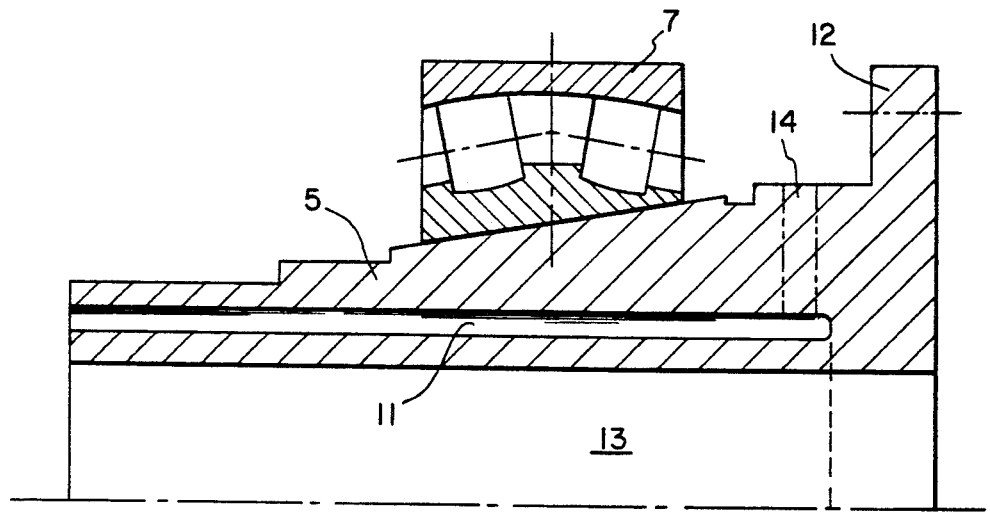
FIG. 2 is a cross sectional illustration of a first embodiment of an annular space between the inside and outside wall of the journal fashioned as a hollow shaft.

FIG. 2 shows a first embodiment of an annular space 11 between the inside and outside wall of the journal 5 fashioned as a hollow shaft. Fashioned as a casting, this journal 5 includes a mounting flange 12 through the intermediary of which it is bolted to the end plate of the drying cylinder. (Alternatively, journal and cylinder end plate may form a single-piece component). Installed on the journal 5 is an antifriction bearing 7, specifically in the form of a self-aligning bearing, which operationally bears on a pillow block. Moreover, a rotary motion is imparted to the journal 5 through a—not illustrated—drive gear which is cut on the journal or attached to it, in which context it is pointed out that the coordination between mounting flange 12, antifriction bearing 7 and drive gear is basically selective, and at that, both in the spacing and relative coordination with one another.

In the embodiment illustrated in FIG. 2, the annular space 11 serving as thermal insulation between the central bore (serving as a conduit for the steam) and the antifriction bearing 7 has been machined as an annular groove from the outer end face of the journal 5. This annular groove is cut by means of a specific crown bit (also called core drill), and at that, sufficiently deep to extend maximally far toward the end with the mounting flange 12. This interrupts the thermal bridge between the cylinder bore 13 and the inner race of the antifriction bearing 7 across the entire circumference, so that said inner race will extensively escape a thermal influence. A steam head contained on the outer (left in FIG. 2) end of the journal 5 has been omitted in FIG. 2. The arrangement is such that the annular groove on the end face is kept open toward the surroundings so that there will be no way for condensate to accumulate in the annular groove. To improve the insulation effect, the annular groove may also be filled with a suitable thermal insulating material.

In view of the above mentioned arrangement or coordination of mounting flange, bearing and drive gear, reference shall be made to the following with the aid of FIG. 1.

The embodiment illustrated here, with the annular groove 11 extending up into the vicinity of the mounting flange 12, should be selected especially when the distance between bearing and free journal end face is relatively small or when—for instance on account of design requirements—the drive gear is arranged between the bearing 7 and the mounting flange 12. In these cases, an optimum thermal insulation effect can be achieved through the annular groove which is machined in deep. (Nonetheless, the drive gear rests in the near-flange, and thus relatively rigid, area of the journal.)

Naturally, this statement applies also when the annular groove according to FIG. 1 is not machined but produced by casting using a tubular core that is inserted in the casting operation. As a further development of the basic idea, this casting core can be adapted to the outside contour of the journal 5, and at that, insofar as the annular groove includes bulges which are consistent with the diameter of the journal 5 that increases toward the mounting flange 12. The thermal insulation between the cylinder bore 13 and the bearing 7 can be further improved thereby.

Both for the machined annular groove and the one cast using a core, radial bores—facultatively slotted bores 14—may be provided in the are of the inside end of the annular groove so as to keep the annular groove open also from the second end. In the case of the annular groove produced by casting, these bores 14 can be realized by several, specifically four, core supports distributed in the form of an axial cross across the circumference, which are removed after casting. Obtained thereby—the same as in the case of the machined annular groove —is an annular space 11 which is open on both sides, which thus is continuously ventilated as a thermally insulating space between the central bore 13 and the bearing 7.

The alternatives explained with the aid of FIG. 2, producing the annular space 11 by machine or casting, are in functional respects equally effective. But it should be noted that the machined annular groove is in terms of concentricity more accurately arranged in the journal 5, thus eliminating wall thickness differences toward the outside wall.

Figure 3:
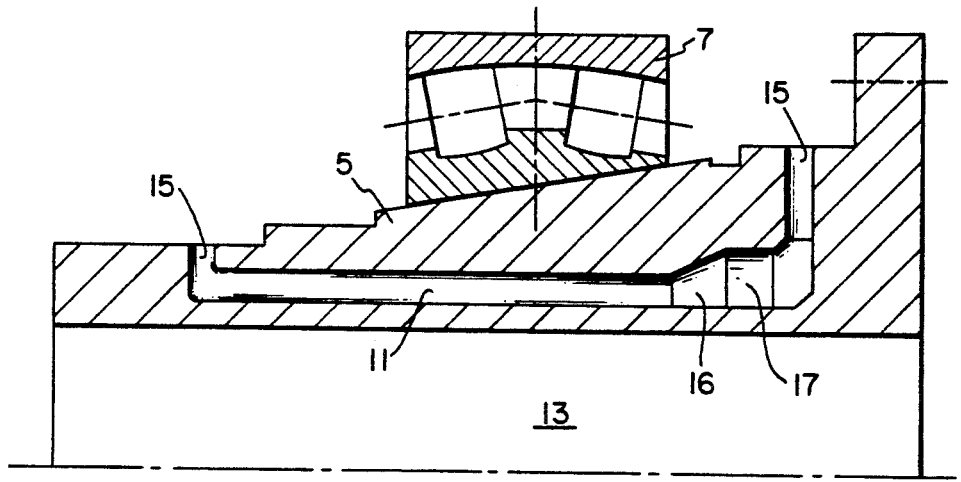
FIG. 3 is a cross sectional illustration of a second embodiment of an annular space between the inside and outside wall of the journal fashioned as a hollow shaft.

FIG. 3 shows a second embodiment of the annular space 11 which is produced as an annular hollow space, by casting, between the end faces of the journal 5, and at that, in the area between its central bore 13 and the bearing 7.

In casting, the core that determines the shape and dimensions of the annular space 11 is held in place through core supports. These and the core itself are removed after casting, forming an annular groove which, through radial ventilation openings 15, is open on both sides. Additionally shown in the example according to FIG. 3 is that by means of bulges 16, 17— previously mentioned in conjunction with FIG. 2—of the annular groove 11 it is possible to exert a defined influence on the material thickness of the journal between the annular groove and the outer wall accommodating the bearing 7.

Figure 4:
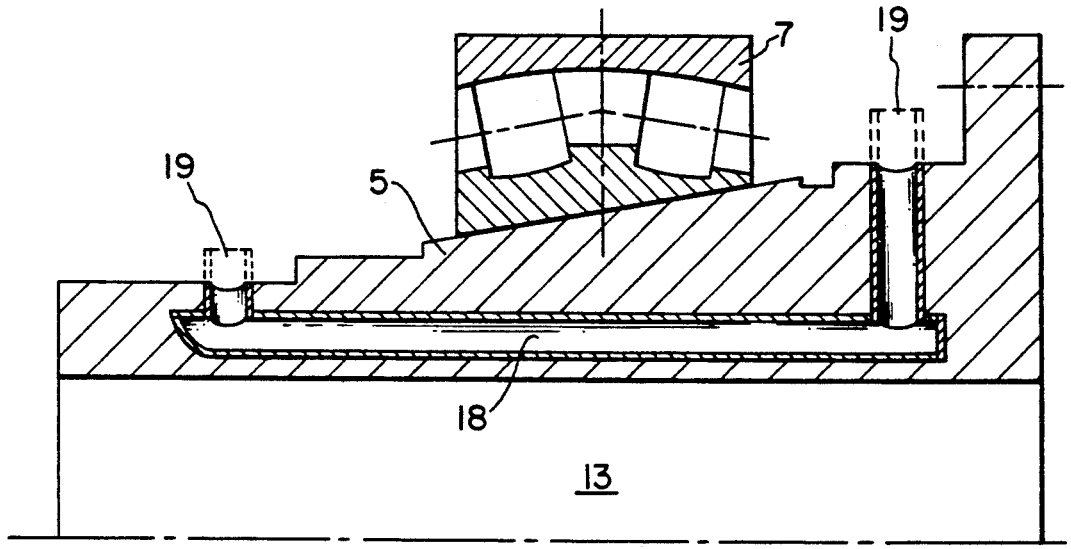
FIG. 4 is a cross sectional illustration of a third embodiment of an annular space between the inside and outside wall of the journal fashioned as a hollow shaft.

FIG. 4 shows a third embodiment of the annular space 11. It is formed here by a ceramic tube which concentrically is cast into the journal 5 or—as illustrated—by a double-walled annular body 18 made from steel plate which, during the casting itself, is supported by, e.g., four steel pipes 19 that are arranged as an axial cross and open toward the interior of the annular body 18 from plate. These steel tubes 19 preferably have an oval cross section, with the longitudinal axis of the oval being axially parallel. As already mentioned in conjunction with the embodiment relative to FIG. 3, the steel tubes serve as openings for creating and ventilation of the interior of the annular body 18 from plate, for another, can additionally be filled with a thermally insulating material.

Figure 5:
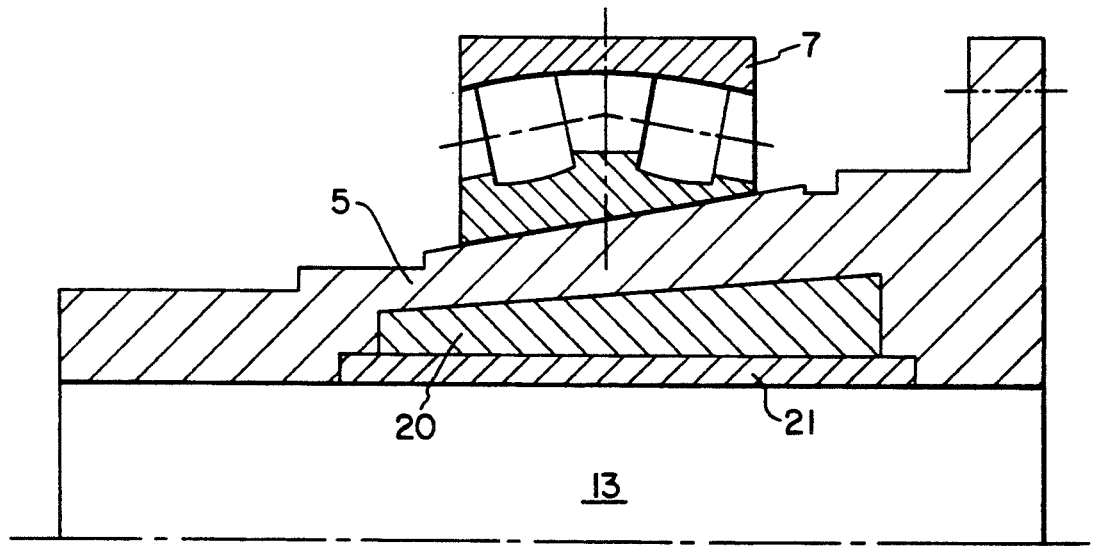
FIG. 5 is a cross sectional illustration of a fourth embodiment of an annular space between the inside and outside wall of the journal fashioned as a hollow shaft.

FIG. 5 shows another, fourth embodiment. Here, the annular space has been formed by means of a core ring 20 from thermally insulating material, the ring being located by the casting. This is accomplished by slipping (and fixing) on the casting core a steel pipe 21 for the central bore 13 of the journal 5, appropriately coordinated with the position of the bearing 7. The core ring 20 is then installed on this steel pipe 21, whereafter the journal 5 is cast. The core ring is preferably designed conically and shorter than the steel pipe 21 so that, for one, allowance is made for the increasing material thickness of the journal 5 and, for another, the core ring 20 will on both end faces be backed off behind the steel pipe 21. Created in casting is now a homogeneous central bore 13 which in part is formed by the steel pipe 21, the latter connecting with the casting of the journal 5 by implantation and firmly enveloping the core ring 20.

Common to the embodiments according to FIGS. 3-5 is that the thermally insulating annular space 11, 18, or 20, unlike in FIG. 2, does not extend up to the end of the journal 5 away from the flange, and is thus not open. The area of the journal 5 away from the flange is thus not open. The area of the journal 5 away from the flange is thus more rigid than is the case in the embodiment according to FIG. 2. This configuration is thus better suited (if required) for accommodating a drive gear or an entire gear set, for instance a slip-on gear set.

In variation from the illustrated embodiments, the journal may also be part of a single-piece hollow shaft of a machine glazing or crepe cylinder, with the hollow shaft (comprising two journals) extending lengthwise through the cylinder.

Disregarding the application for steam-heated drying cylinders of a paper machine as described above—the invention can also be used for heatable rollers of calenders and drying machines of various type.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A journal including a hollow shaft, through which flows a heat transfer medium for use with a hollow roll body, specifically a steam-heated drying cylinder of a paper machine, wherein thermal insulation is provided between the interior space of the hollow shaft and a bearing mounted on said hollow shaft and supporting said hollow shaft, said thermal insulation being formed by a coaxial annular space, wherein the hollow shaft is a unitary casting and serves both as a journal and as a conduit for a heat transfer medium, the coaxial annular space being formed by an annular groove which is recessed from an end face of said journal and being defined by two annular walls of the hollow shaft in at least the area of support of the bearing.

2. The journal according to claim 1, characterized in that said journal comprises a casting and that the annular space (11) is an annular hollow space formed in said casting by means of a core.

3. The journal according to claim 2, characterized in that the annular hollow space includes bulges which are adapted to the contour of the outside wall of the journal (5).

4. The journal according to claim 2, characterized in that the annular hollow space is filled with a thermal insulating material.

5. The journal according to claim 1, characterized in that said journal comprises a casting and that the annular space is formed by a thermal insulating element which is molded in said casting.

6. The journal according to claim 5, characterized in that the thermal insulating element is a cast-in ceramic tube which has been specifically adapted to the contour of the outer wall of the journal.

7. The journal according to claim 5, characterized in that the thermal insulating element is a cast-in double wall annular body from plate (18) which is specifically adapted to the contour of the outside wall of the bearing.

8. The journal according to claim 7, characterized in that the annular body from plate (18) is filled with a thermal insulating material.

9. The journal according to claim 7, characterized in that the annular body from plate (18) is coarsely sandblasted and/or tin plated.

10. The journal according to claim 1, characterized in that the annular space is formed by a core ring (20).

11. The journal according to claim 3, characterized in that the annular hollow space is filled with thermal insulating material.

12. The journal according to claim 8, characterized in that the annular body from plate (18) is coarsely sandblasted and/or tin plated.

13. A rotatable drying cylinder assembly comprising:
a hollow generally cylindrical roll body having an interior space defined therein;
a journal mounted on said roll body at an axial end of said body, said journal comprising a hollow shaft having an inner wall and an outer wall, and having an axial bore extending therethrough interiorly of said inner wall; said journal further having an outer end face opposite said roll body; said axial bore communicating with said interior space of said roll body and serving as a conduit for a heat transfer medium, said hollow shaft being a unitary casting and having a coaxial annular space formed therein, said coaxial annular space being defined by two annular walls of said hollow shaft and being formed by an annular groove which is recessed from said outer end face of said journal; and
bearing means mounted on said hollow shaft and being adapted to support said roll body, wherein said coaxial annular space is located in at least the area of support of said bearing means.

14. A journal for a rotatable drying cylinder, said drying cylinder comprising a hollow generally cylindrical body having two opposing end plates at respective axial ends of said body and an interior space therebetween, said journal comprising: a hollow shaft mounted on an end plate of said drying cylinder in axial alignment with said cylinder and having an axial bore extending therethrough, said axial bore communicating with said interior space through an opening in said end plate and serving as a conduit for a heat transfer medium, said hollow shaft being a unitary casting and being rotatably supported by bearing means mounted on said hollow shaft; said hollow shaft having an end face situated at an opposite axial end of said hollow shaft from said end plate opening, said hollow shaft further having a coaxial annular space formed therein by an annular groove which is recessed from said end face of said hollow shaft, said coaxial annular space being defined by two annular walls of said hollow shaft in at least the area of support of said bearing means.

* * * * *